Nov. 23, 1965     J. R. MacPHERSON     3,218,798
SPHERICAL BOOSTER

Filed Jan. 30, 1963     3 Sheets-Sheet 1

INVENTOR.
JAMES R. MACPHERSON
BY
*Martha L. Ross*
AGENT

Nov. 23, 1965    J. R. MacPHERSON    3,218,798
SPHERICAL BOOSTER

Filed Jan. 30, 1963    3 Sheets-Sheet 2

INVENTOR.
JAMES R. MACPHERSON
BY
*Martha L. Rose*
AGENT

INVENTOR.
JAMES R. MACPHERSON
BY
Martha L. Ross
AGENT

United States Patent Office
3,218,798
Patented Nov. 23, 1965

3,218,798
SPHERICAL BOOSTER
James R. MacPherson, Falls Church, Va., assignor to Atlantic Research Corporation, Fairfax, Va., a corporation of Virginia
Filed Jan. 30, 1963, Ser. No. 254,955
9 Claims. (Cl. 60—35.6)

This invention relates to new and improved rocket motors. More specifically, it relates to rocket motors designed for burning semi-solid propellants.

Our space and defense programs urgently require rocket boosters having high thrust capability. Liquid propellants can provide such thrust but present serious difficulties such as exceedingly complex storage and feeding requirements, propellant instability, combustion instability, low density and corrosiveness, and lack of standby readiness, since the propellants must generally be loaded into the rocket as close as possible to take-off time.

Solid propellant rockets have important advantages in terms of structural and operational simplicity, stability, high loading density, and standby readiness. They do, however, pose certain problems which become increasingly difficult to solve with increasing size of the grain. Solid propellants, after mixing of the components such as oxidizer, organic fuel binder, high energy additives and the like, must be cast and cured at elevated temperatures and, frequently, under high pressure. This is a hazardous, time-consuming and expensive operation which becomes more and more difficult with increasing web thickness of the grain, since curing must be uniform throughout. Upon cooling, the cured propellant composition sets into a shaped, rigidly-solid mass which must be completely free from even minute cracks of fissures, since such flaws might cause it to shatter under pressure or vibrational stress in the combustion chamber and thereby, provide large, unscheduled and uncontrollable burning surfaces resulting in explosion of the motor. The cast grains, therefore, must be carefully inspected by X-ray and other means and rejected if imperfections are found. This is still another time-consuming and costly operation, particularly if the rejection rate is considerable. Solid propellants are also sensitive to extremes of ambient temperature. At low ambient temperatures, they tend to become brittle, which can cause fissuring. At high ambient temperatures, they tend to plastic flow which can cause shape distortions and result in undesirable changes in the predesigned burning surface.

Solid propellant grains are generally designed to burn only on a preselected burning surface or surfaces. The others are restricted against burning by the application of an inhibitor coating, which must bond perfectly to the grain surface from the time of application through the burning period of the grain, since separation can cause disastrously increased burning surface area.

Solid propellant grain manufacture is not feasible on-site. The finished grains must be shipped to the loading base or must be loaded into the rocket motors at the production plant prior to shipment. The transportation of large solid grains, either as such, or loaded into the rocket motor casing introduces still another hazard because of possible fissuring or cracking of the solid propellant mass or separation of the inhibiting liner.

Still another limiting feature of solid propellent grains is the fact that, once cast and cured, they are fixed in size and configuration and must be used in the motor for which they have been specifically designed. If the motor is redesigned in size or shape, new grains must generally be made.

Solid propellants are also limited in composition formulation because of the physical property requirements of the cured grain. These requirements make it difficult, and sometimes impossible, to incorporate many additives which would enhance ballistic properties.

There have recently been developed semi-solid monopropellant compositions which, though viscous and of a cohesive, paste-like consistency, are essentially fluid, since they are capable of flow at ordinary temperature under applied pressure and under the pressure of their own weight. Thus they can be pumped into a container where they flow into a continuous mass free from cracks or fissures.

Semi-solid monopropellants possess many of the advantages of solid propellants, such as high density, relatively low heat and shock sensitivity, good stability, storageability for long periods without deterioration, freedom from leakage, and low corrosiveness and toxicity. They also eliminate many of the disadvantages of solid propellants. The semi-solid compositions need only to be mixed in suitable mixing equipment uniformly to distribute the components, such as solid oxidizer and other solid additives in the liquid organize fuel vehicle, and are then ready for loading at the production facility, or for pumping into tank cars for shipping and on-site loading. Thus they eliminate costly casting, curing, inspection for flaws, and the problems inherent in the shipment of solid propellent grains before or after loading into rocket motors. Extremes of ambient temperature are no problem since the semi-solid monopropellant does not embrittle at low temperature and plastic flow is a normal characteristic which is taken into account in its normal mode of use.

Because of their fluidity, the semi-solid monopropellants are not readily amenable to conventional rocket motor loading for most applications requiring an upward trajectory. They pose an additional problem in that burning surface area is limited to the upper surface of the semi-fluid mass. Unlike solid grains, they cannot be perforated or slotted to provide increased burning surface area.

Copending Grover and MacPherson application Serial No. 111,396, now Patent No. 3, 122,884, filed May 19, 1961, of common assignee, discloses a rocket motor which effectively solves these problems. The motor described therein comprises a cylindrical motor casing which has closure members across its top or forward end and across its bottom or aft end and which is internally divided by one or more transverse partitioning members or trays into a plurality of vertically-tiered receptacles or compartments for receiving semi-solid monopropellant when the motor is in its normal vertical or upright position. Each compartment is filled to a level short of its forward closure with a viscous pool of the monopropellant, the top surface of which provides an ignition surface which burns downward in a direction opposite to motor thrust. Communication of the compartments with each other and with one or more restricted, rearwardly directly nozzles, for venting the high temperature, high pressure combustion gases out of the motor, is achieved by means of at least one tubular exhaust stack or standpipe, which extends upwardly from each partitioning member to a point short of the upper or forward closure of the compartment and opens through the partition to communicate with the upper or forward portion of the compartment below.

The motor thus divides the total semi-solid-propellant load into a plurality of segments, each of which contributes a burning surface area equal to the cross-sectional area of the motor less the relatively small space occupied by the exhaust stack or stacks. This burning area is multiplied by the number of segments to produce a high mass rate of gas generation.

The motor design also makes possible boosting in an upward trajectory since the viscous propellant is kept from venting with the combustion gases out of a rearwardly positioned nozzle under accelerative set-back forces by the supporting and restraining action of the partitioning members. The rear closure of the rocket is also designed to provide similar restraining action when it serves as the floor of the rearmost receptacle.

The interior wall of the rocket, as is conventional with a solid propellent motor, is lined with suitable insulation. The partitioning members are similarly insulated and the stacks are fabricated of insulation material with structural rigidity. Since the semi-solid propellant, under the pressure of its own weight, flows into and is maintained in intimate contact with the insulated walls, floor and stacks which combine to form the retraining receptacle for the propellant, the inhibitor liner, which must be bonded to similarly positioned surfaces of a solid propellent grain to prevent their ignition, can be dispensed with. This not only eliminates a costly, time-consuming operation, but the hazards attendant upon inhibitor failure.

Such motors are not size limited by the factors that constitute the major problem areas in scaling-up rockets of the more conventional type, such as pump, plumbing, injector, and tankage requirements in liquid rockets, and web thickness, curing, and physical properties problems in solid rockets. Elimination of these problems reduces very considerably development and production time and costs.

The cylindrical motors described in said copending application, however, suffer a weight penalty by comparison with solid propellant motors of similar cylindrical configuration because of the necessity for providing trays of adequate strength to hold the weight of monopropellant in each tier of segment.

Large multi-stage rocket vehicles employing a cylindrical booster utilizing a semi-solid propellant, as is similarly the case with conventional cylindrical liquid or solid propellant boosters, are aerodynamically unstable because the aerodynamic center of pressure is forward of the vehicle's center of gravity. Artificial stability can be achieved by thrust vectoring. However, any structural design of the motor which improves stability of the vehicle is obviously desirable.

The cylindrical semi-solid propellant motor provides some latitude in the shaping of the thrust curve. Some thrust curves that may be highly desirable for certain large vehicle applications are, however, difficult to achieve without compartment contouring with inert filler and, therefore some weight penalty and reduction in volumetric efficiency.

The object of this invention is to provide semisolid propellant motors of improved motor mass fraction and volumetric efficiency.

Another object is to improve the stability of vehicles employing such a motor as the booster stage.

Still another object is to provide a semi-solid propellant motor of improved design which is highly versatile in its adaptability to thrust contouring.

Other objects and advantages will become obvious from the following detailed description and the drawings.

Broadly speaking, the rocket motor of the invention comprises a substantially spherical motor casing which is internally divided by one or more transverse partitioning members or trays into a plurality of vertically-tiered receptacles for the semi-solid monopropellant which are progressive or regressive depending on their position above or below the equator of the sphere. Each compartment is filled to a level short of its forward closure with a viscous pool of the monopropellant, which burns on its upper surface. The regenerating burning surface area is progressive or regressive depending on the position of the particular compartment.

Communication of the compartments with each other and with one or more restricted, rearwardly directed nozzles, for venting the high temperature, high pressure combustion gases out of the motor, is achieved by means of at least one tubular exhaust stack or standpipe, which extends upwardly from each partitioning member to a point short of the upper or forward closure of the compartment and opens through the partition to communicate with the upper or forward portion of the compartment below.

Figure 1:
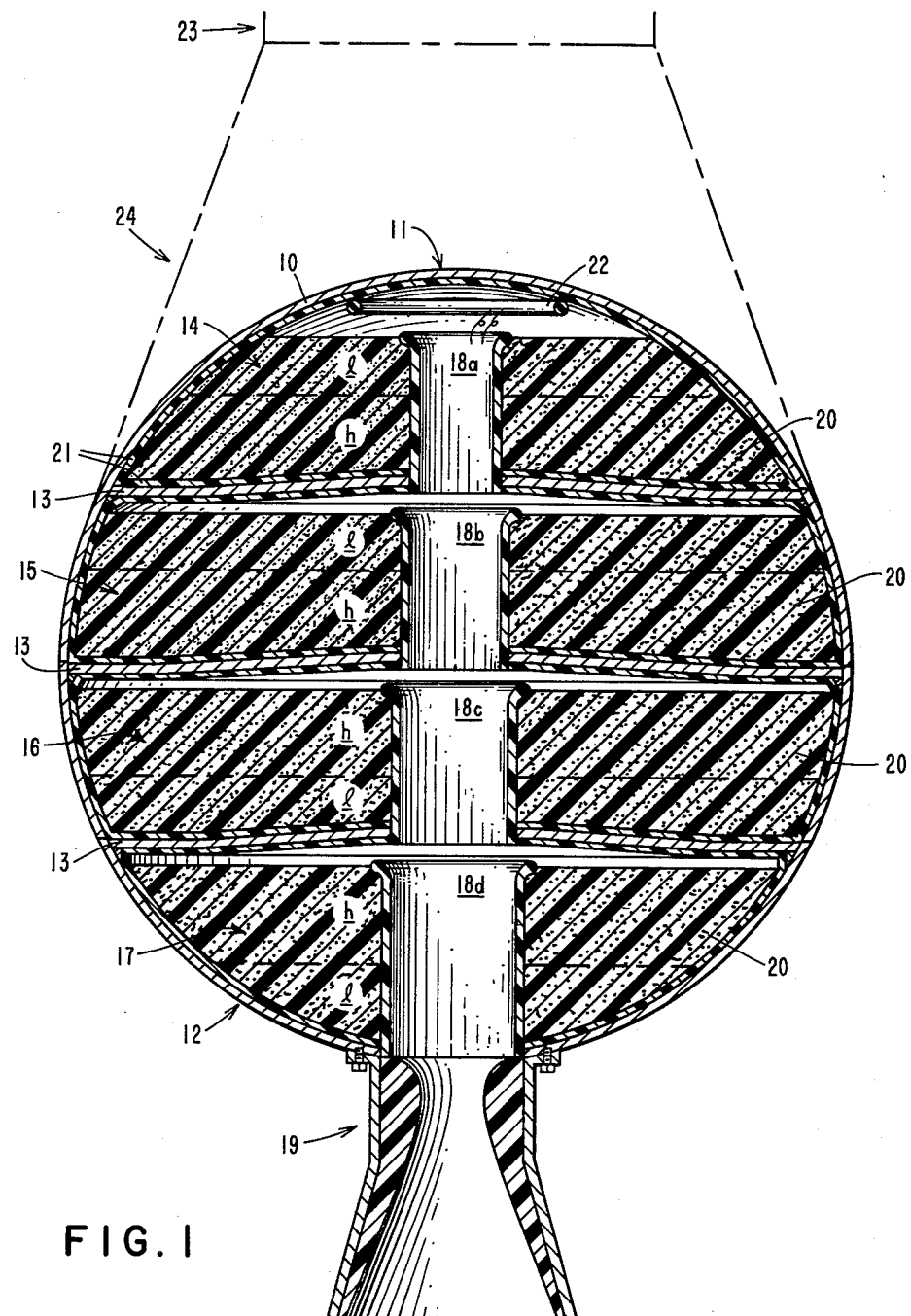
FIGURE 1 is a vertical longitudinal view through one form of the rocket motor of the invention.

Reverting now to the drawings, FIGURE 1 shows diagrammatically a four-chambered rocket motor illustrative of the invention, in which spherical motor casing 10 consists of forward and rearward hemispherical sections 11 and 12. Transverse trays or partitioning members 13 divide the interior of the spherical casing into four vertically positioned compartments 14, 15, 16, and 17.

Each tubular member or stack 18a, 18b, and 18c is mounted on and opens rearwardly through a tray 13 so that the stack is in open communication with the forward or upper portion of the compartment or chamber next below, and extends upwardly from the tray to a point spaced rearwardly of the forward closure of the compartment in which it is seated. Tubular stack member 18d extends forward from the rear wall of the spherical motor casing to a point spaced rearwardly of the front closure of chamber 17 defined by tray 13, and opens rearwardly through the casing wall in direct communication with rearwardly-directed restricted gas venting nozzle 19. Tubular members 18a–d also provide, in combination with the trays or the rear casing wall, receptacles for receiving semi-solid monopropellant 20.

It will be noted that the tubular stacks 18a, 18b, 18c and 18d increase in diameter. Though not essential, this is a useful expedient for accommodating the increasingly larger volume of combustion gases venting rearwardly from each succeeding monopropellant-containing compartment.

All of the interior surfaces of the motor walls and partitioning members are insulated with suitable insulating material 21. The exhaust stacks can be made of a metal shell suitably insulated on both surfaces or of a rigid insulating material as shown. Conventional igniter 22 mounted in any suitable manner is included to initiate combustion of the monopropellant.

A second stage motor or payload 23 shown partially and diagrammatically can be attached to the forward end of motor 10 in any suitable manner. Shroud or cowling 24 is fitted at a suitable angle to minimize drag.

Figure 2:
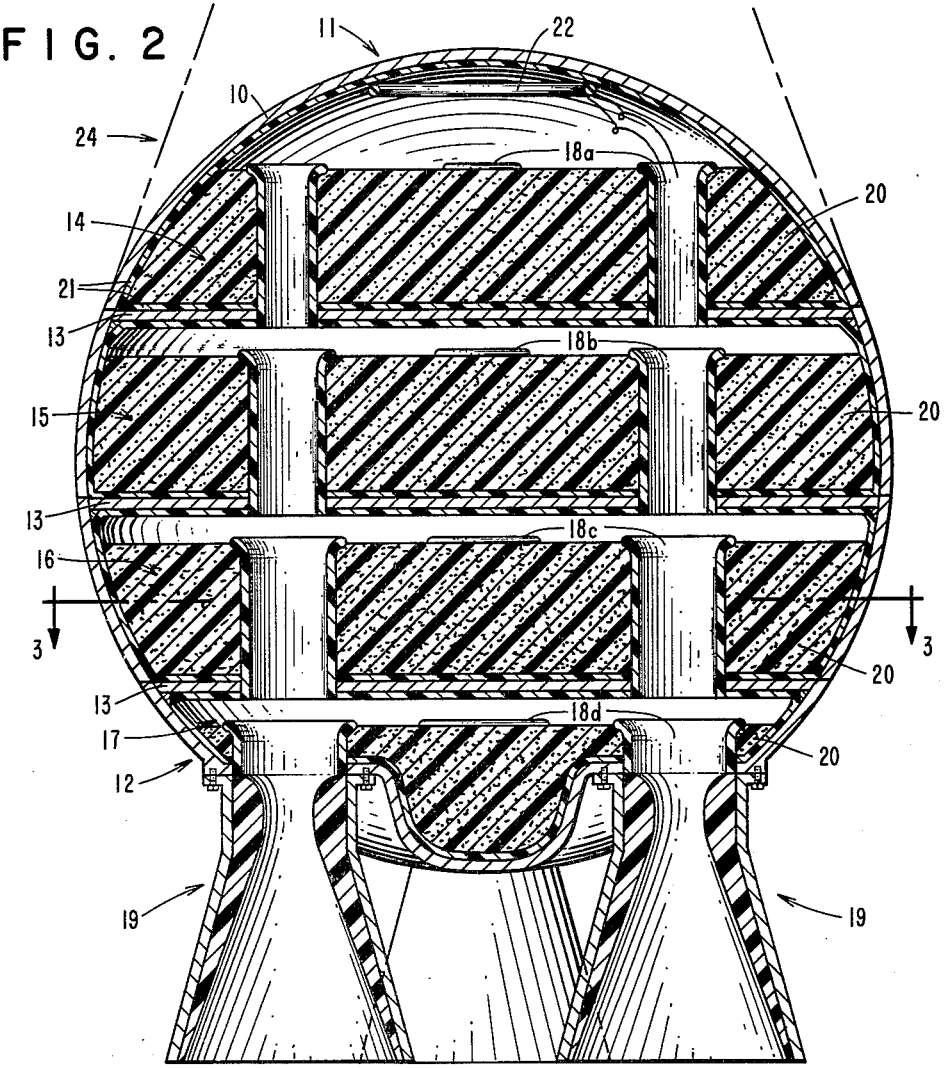
FIGURE 2 is a vertical, longitudinal view through a modified form of the motor.
Figure 3:
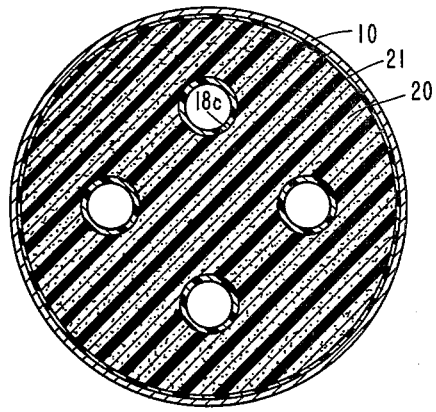
FIGURE 3 is a transverse cross-section reduced in scale taken along line 3–3 of FIGURE 2.

For purposes of simplicity, the embodiment described above and shown in FIGURE 1 has been in terms of a single, axially aligned series of tubular exhaust members venting out through a single nozzle. In large motors a plurality of diametrically-spaced, longitudinally-aligned series of tubular members can be employed as shown in FIGURES 2 and 3 to minimize componet size. In the embodiment shown in these figures, each of the tubular stack series vents into a rearwardly mounted nozzle aligned therewith.

It will be understood that, as shown in aforementioned copending application Serial No. 111,396, now Patent No. 3,122,884, of diametrically-spaced, longitudinally-aligned tubular stack series can vent into a common aft plenum which in turn vents out of one or more suitably mounted nozzles. It will also be understood that the number and depths of the transverse, propellant-containing chambers can be varied as required for any particular motor size and application.

Figure 4:
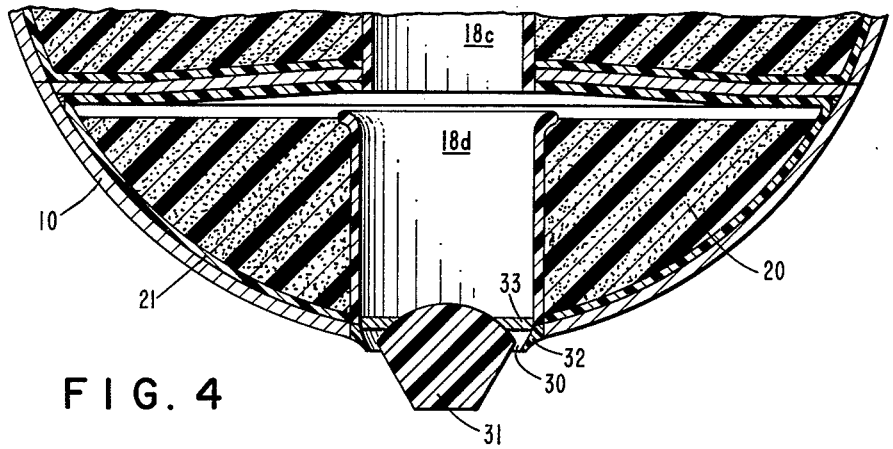
FIGURE 4 is a fragmentary longitudinal sectional view through another motor modification.
Figure 5:
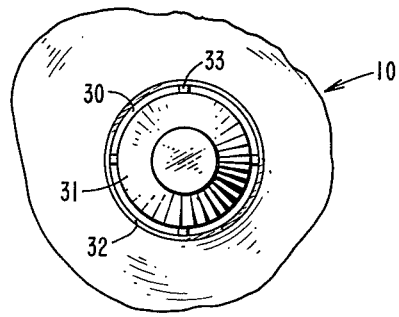
FIGURE 5 is a bottom plan view of the motor of FIGURE 4.

The design of the spherical motor is particularly amenable to the use of an annular plug nozzle, which can be mounted on the motor in a number of ways, one of which is shown by way of illustration in FIGURES 4 and 5.

The annular orifice 30 for venting of the high pressure, high temperature combustion gases issuing from tubular exhaust stack 18d in the aft compartment of motor 10 is formed by the appropriately contoured plug 31 and annular lip 32, the latter in this case being an insulated, heat and erosion resistant extension of the motor wall. The plug is fastened in position by struts 33.

As aforementioned, the semi-solid monopropellants are viscous compositions which flow at normal temperatures under stress or pressure, including the pressure of their own weight. Flow may be relatively slow in some formulations because of the high viscosity, but, given adequate time, such as an hour or so, the monopropellant will flow into a continuous mass in its receptacle. This process can be hastened by expedients such as heating or vibration. Preferably the monopropellant has good cohesive properties. Cohesive strength is closely related to tensile strength. In general, the minimum desirable tensile strength of the material is about 0.01 p.s.i. and preferably about 0.03 p.s.i.

Such semi-solid, gas-generating monopropellants of a large variety of chemical compositions are known in the art. It should be noted that this invention is concerned primarily with the physical characteristics of such monopropellants and not with any specific chemical formulation.

Many different semi-solid monopropellent compositions tailored to different performance requirements can be made having the aforedescribed physical characteristics. The monopropellent composition can, for example, be a double base type propellent, such as nitroglycerine gelled to the proper semi-solid consistency by solution therein of nitrocellulose. Generally, it will comprise a stable dispersion of a finely-divided, insoluble oxidizer in a continuous matrix of an oxidizable liquid fuel which burns to produce large quantities of high energy combustion gases.

The spherical motor is particularly well suited for thrust shaping because of the existence of progressive and regressive compartments. With the same propellant in all chambers the thrust curve is neutral with time, provided that the compartments are symmetrically oriented about the equator. A great deal of latitude in modifying the thrust curve for specific applications is further provided in such a motor by variation of the compartments in number, depth and orientation relative to the equator; by the use of monopropellants of different burning rate in the different compartments; and by layering monopropellants of different burning rate, one atop the other, in the same compartment.

Figure 6:
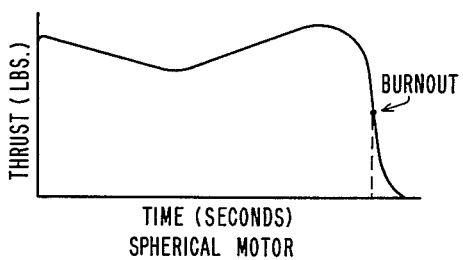
FIGURES 6 and 7 are graphs showing thrust-time curves.

Of particular importance is the fact that the spherical motor makes possible the achievement of a thrust curve approaching the ideal thrust-time relation for booster application with no sacrifice in motor mass fraction or volumetric efficiency. This is shown graphically in FIGURE 6. Such a saddle curve allows higher lift-off acceleration, compatibility with optimum dynamic pressure restriction, and rapid increase in acceleration after passing the high dynamic pressure regime. This kind of thrust shaping is obtained in the spherical motor by layering monopropellants of different burning rates in each of the compartments, as shown by the dotted lines in FIGURE 1. A layer of lower burning rate propellant (l) is superimposed on a layer of higher burning rate monopropellant (h) in the compartments above the equator and the situation reversed in the compartments below.

Figure 7:
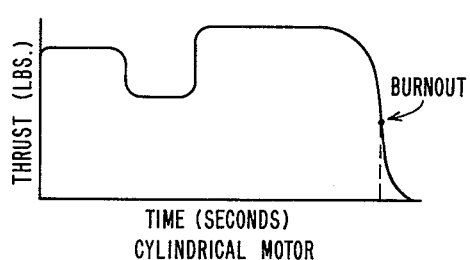

Such a saddle curve can be obtained with a cylindrical motor only by contouring the compartments with inert filler. The use of superimposed layers of monopropellant of different burning rate in the same compartment of such a motor results in an abruptly plateaued curve such as that shown graphically in FIGURE 7.

The spherical semi-solid motor design markedly diminishes dead weight as compared with that of the cylindrical semi-solid motor, thereby improving efficiency. The relationship between propellant weight and dead weight is generally defined in the art, as "motor mass fraction" and is the ratio of the weight of propellant to total weight of the loaded motor. With a semi-solid propellant of adequate linear burning rate, the spherical motor can be designed with a motor mass fraction equivalent to that of a conventional cylindrical solid propellant motor optimized to give equivalent vehicle performance.

The spherical motor also substantially improves volumetric efficiency, namely the ratio between volume of the propellant and total volume of the rocket motor.

Table I presents data comparing the motor mass fraction and volumetric efficiency of large cylindrical and spherical semi-solid propellant rocket boosters and a conventional solid propellant rocket booster, all designed to boost the same payload to the same velocity at booster burnout with the same takeoff thrust-to-weight ratio. The same semi-solid propellant was used in the cylindrical and spherical semi-solid boosters and has a specific impulse, Isp (lb.-sec./lb.), identical to that of the conventional solid propellant.

*Table I*

|  | Cylindrical Semi-Solid | Spherical Semi-Solid | Conventional Solid |
| --- | --- | --- | --- |
| Motor Mass Fraction | 0.899 | 0.917 | 0.918 |
| Volumetric Efficiency, percent | 84.4 | 85.7 | 79.2 |

The spherical semi-solid rocket booster also improves stability of a multi-stage vehicle as compared with any type of cylindrical booster since the shorter spherical stage causes the vehicle center of gravity to move forward, thus decreasing the effective moment arm of the center of pressure about the vehicle center of gravity. If shrouding is used between the first and second stages, as shown in FIGURE 1, the vehicle center of pressure moves aft because of the larger diameter of the first stage, further decreasing the center-of-pressure moment arm.

In the large rocket sizes for which the spherical motor of the invention is particularly well adapted, the relatively high cross-sectional area will not significantly affect flight performance. Although the drag of a rocket increases with increasing cross-sectional area, thrust is proportional to the volume increase. Thus the drag becomes less important as the vehicle increases in size to the point where it becomes a negligible percentage of the thrust.

Although this invention has been described with reference to illustrative embodiments thereof, it will be apparent to those skilled in the art that the principles of this invention can be embodied in other forms but within the scope of the claims.

I claim:

1. A rocket motor for burning a semi-solid monopropellant, comprising a substantially spherical motor casing, at least one transverse partitioning member which divides the interior of said casing into a plurality of chambers for receiving semi-solid monopropellant when said motor is in upright position, said partition forming the rearward wall of one of said chambers and the forward wall of the next adjacent rearward chamber, said partitioning member having at least one forwardly-extending tubular member opening therethrough, said tubular member terminating at its forward end at a point spaced rearwardly of the forward wall of the chamber in which said tubular member is seated and opening rearwardly into the forward portion of the next adjacent rearward chamber, and at least one rearwardly directed nozzle means for venting the combustion gases produced by burning of said semi-solid monopropellant out of said rocket motor, said nozzle means being in open communication with said tubular member.

2. The rocket motor of claim 1 in which said nozzle means is mounttd on the rear wall of said motor.

3. The rocket motor of claim 2 in which the chamber rearward of the rearmost partitioning member is defined rearwardly by the rear wall of said motor, said chamber containing seated therein at least one tubular member, said tubular member extending forwardly from said rear wall to a point spaced rearwardly from said partitioning member and opening rearwardly through said rear wall into said nozzle means.

4. The rocket motor in claim 1 having a plurality of said transverse partitioning members, which are longitudinally spaced.

5. The rocket motor of claim 4 in which each of said transverse partitioning members has a plurality of said forwardly-extending tubular members opening therethrough.

6. The rocket motor of claim 4 in which the tubular members opening through the several partitioning members are longitudinally aligned.

7. The rocket motor of claim 4 in which said nozzle means is mounted on the rear wall of said motor.

8. The rocket motor of claim 1 wherein the propellant burning area within each of said chambers varies continuously in relation to the elapsed burning time.

9. The rocket motor of claim 1 wherein one of said chambers contains at least two layers of semi-solid monopropellants, one of said layers having a different burning rate than the other of said layers.

References Cited by the Examiner

UNITED STATES PATENTS

| | | | |
|---|---|---|---|
| 3,001,363 | 9/1961 | Thibodaux et al. | 60—39.47 |
| 3,052,092 | 9/1962 | Kirkbride | 60—35.6 |
| 3,094,072 | 6/1963 | Parilla | 60—35.6 |
| 3,121,309 | 2/1964 | O'Donnell | 60—39.47 |
| 3,122,884 | 3/1964 | Grover et al. | 60—39.47 |

FOREIGN PATENTS 1,128,730   8/1956   France.

OTHER REFERENCES

Aviation Week, Feb. 1, 1960; pp. 16–19.

MARK NEWMAN, *Primary Examiner.*

SAMUEL LEVINE, *Examiner.*

UNITED STATES PATENT OFFICE
CERTIFICATE OF CORRECTION

Patent No. 3,218,798                              November 23, 1965

James R. MacPherson

It is hereby certified that error appears in the above numbered patent requiring correction and that the said Letters Patent should read as corrected below.

Column 4, line 69, before "of" insert -- a plurality --; column 7, line 5, for "mounttd" read -- read -- mounted --.

Signed and sealed this 27th day of September 1966.

(SEAL)
Attest:

ERNEST W. SWIDER                              EDWARD J. BRENNER
Attesting Officer                                      Commissioner of Patents